United States Patent [19]

Lawson

[11] 4,348,988
[45] Sep. 14, 1982

[54] POULTRY FEEDER WITH INFINITE ADJUSTMENT

[75] Inventor: John D. Lawson, Leesburg, Ind.

[73] Assignee: Cyclone International, Inc., Holland, Mich.

[21] Appl. No.: 222,237

[22] Filed: Jan. 5, 1981

[51] Int. Cl.³ .................. A01K 39/01; B67D 3/00
[52] U.S. Cl. .................................. 119/53; 222/549
[58] Field of Search ............. 119/52 B, 52 AF, 53; 138/96 T; 222/520, 549, 568

[56] References Cited

U.S. PATENT DOCUMENTS

| | | | |
|---|---|---|---|
| 905,393 | 12/1908 | Webb | 119/53 |
| 3,004,715 | 10/1961 | Gadd | D8/387 X |
| 3,101,159 | 8/1963 | Fletcher | 119/52 AF |
| 3,230,933 | 1/1966 | Myers et al. | 119/53 |
| 3,254,799 | 6/1966 | Gardner et al. | 222/549 X |
| 3,388,690 | 6/1968 | Hostetler | 119/53 |
| 3,511,215 | 5/1970 | Myers | 119/53 |
| 3,566,843 | 3/1971 | Van Huis et al. | 119/53 |
| 3,811,412 | 5/1974 | Murto et al. | 119/53 |
| 3,911,868 | 10/1975 | Brembeck | 119/53 |
| 3,971,340 | 7/1976 | Allen | 119/53 |
| 4,139,023 | 2/1979 | Turley | 138/96 T |

Primary Examiner—Gene Mancene
Assistant Examiner—Robert P. Swiatek
Attorney, Agent, or Firm—Blanchard, Flynn, Thiel, Boutell & Tanis

[57] ABSTRACT

A poultry feeder including a tubular feed drop adapted to be secured to a conveyor tube for discharging animal feed downwardly therethrough. A feed pan is spaced downwardly from the lower end of the feed drop. A hollow feed-flow control member is adjustably mounted on the feed drop in telescopic relationship therewith and projects downwardly therefrom. The feed-drop and control member have meshing opposed threads for supporting the control member on the feed-drop while enabling the elevation of the control member to be selectively adjusted in response to rotation thereof, whereby the feed-discharge gap between the lower end of the control member and the bottom wall of the pan can be infinitely adjusted over a selected range.

14 Claims, 4 Drawing Figures

POULTRY FEEDER WITH INFINITE ADJUSTMENT

FIELD OF THE INVENTION

This invention relates to a poultry feeding apparatus and, more specifically, to a pan-type poultry feeder having an improved feed control assembly associated therewith.

BACKGROUND OF THE INVENTION

Poultry feeders of the general type contemplated herein are well known and usually comprise a feed conveyor, such as a chain or auger, which directs feed to a plurality of feeders located along the conveyor. Each of the feeders includes a dispensing pan for receiving the feed and making same available to the poultry.

This conventional feeder is mounted on and is generally suspended downwardly from the conveyor, and the feed which is moved along the conveyor is discharged therefrom downwardly through a feed control assembly, which in turn controls the flow of feed therefrom into the pan. The feed control assembly conventionally utilizes an upper feed tube or drop which is secured to and projects downwardly from the conveyor, and the lower end of this feed tube is often telescopically surrounded by a control sleeve which can be vertically displaced to vary the vertical gap which exists between the lower end of the control sleeve and the pan bottom, thereby regulating the quantity of feed which is discharged from the control assembly into the pan. The control sleeve is normally supported such that it can be elevationally adjustably positioned only at selected positions or steps, so that the feed-dispensing gap between the pan and the control sleeve is thus adjustable only in discrete steps.

For example, in a construction which is extensively utilized throughout this industry, the control sleeve is supported on and suspended from the feed drop by releasable spring clips or detents, which detents cooperate with a plurality of vertically (and often peripherally) spaced holes or slots. By manually releasing the spring clips or detents, the control sleeve can be manually vertically (and circumferentially) adjusted so that the clips or detents align with a new hole or slot, whereupon the clips or detents are released to lock the control sleeve in its newly-selected elevation. While this type structure does permit the feed-dispensing gap to be adjusted, nevertheless it enables this adjustment to occur only in select increments or steps, and it has been discovered that such stepwise adjustment is oftentimes inadequate to provide the precise control required for optimum feeding of poultry. In addition, this type adjustment normally requires the operator to utilize both hands in order to accomplish the adjustment of the control sleeve. This structure is also of substantial complexity in that the feed drop and control sleeve are normally fabricated from metal, and hence have to be provided with suitable slots, openings or apertures therein, and suitable clips or detents must be provided for cooperation between the slots and/or apertures formed in the feed drop and control sleeve. The overall assembly is thus substantially expensive to fabricate. Examples of feeders of this type are U.S. Pat. Nos. 3,230,933, 3,585,970 and 3,971,340.

In another variation of a conventional feeder, while there is again provided a control sleeve which is elevationally adjustable relative to the feed drum, nevertheless in this variation the control sleeve is held by a support which fits on or within the pan, which support employs releasable clips or detents which engage a series of holes or slots in the control sleeve to permit incremental or steplike adjustment in the elevation of the control sleeve. This thus again possesses the disadvantageous incremental adjustment of the feed gap, and also oftentimes interferes with proper flow of feed in the pan due to the presence of the support therein. Examples of this construction are U.S. Pat. Nos. 3,388,690 and 3,811,412.

In still another conventional variation, the control sleeve is integral or fixed with the feed drop, and the pan is directly suspended from the control sleeve by suitable clips or brackets which releasably cooperate with a series of holes or slots in the control sleeve or other related structure, so that by releasing the support arrangement, the pan is itself physically raised and lowered and then resecured so as to vary the feed discharge gap. The adjustment occurs only in discrete steps or increments, and is further disadvantageous since the pan itself must be physically disconnected and its elevation manually changed in order to adjust the feed flow. Changing the elevation of the pan is obviously undesirable since this thus changes its position relative to the floor. Examples of this type apparatus are U.S. Pat. Nos. 3,408,988, 3,511,215, 3,566,843 and 3,911,868.

Accordingly, it is an object of this invention to provide an improved poultry feeder, specifically a dispensing pan assembly, which is generally of the first aforesaid type but which overcomes the aforesaid disadvantages.

More specifically, the present invention relates to an improved pan-type poultry feeder wherein the tubular feed control assembly permits the annular dispensing gap between the feed pan and the control sleeve to be infinitely adjusted over a rather wide range so as to permit the feed dispensing rate to be precisely adjusted and controlled, thereby providing for optimum feeding of poultry, and hence eliminating the problems which have long been associated with feeders which have solely permitted incremental or stepwise adjustment. This improved feeder also permits the infinite adjustment of the control sleeve to be easily performed, such as by simple manual single-handed manipulation of the control sleeve, without requiring release of support clips or detents or similar devices, so that a precise adjustment operation can be carried out simply and efficiently. This improved poultry feeder is further advantageous since the feed control assembly is formed solely of two parts, namely the tubular feed drop and the control sleeve, and hence the poultry feeder can be manufactured and assembled efficiently and economically.

Summarizing a preferred embodiment of the invention, the poultry feeder possesses a feed control assembly which includes a tubular feed drop secured to and projecting downwardly from the conveyor, and a tubular feed-flow control member which is mounted on and projects downwardly below the feed drop. The upper portion of the feed drop has a suitable structure, such as a flange, which mounts thereon a top plate associated with a hoodlike wire grille, which grille projects downwardly and outwardly and engages the rim of the pan for supporting same below the feed control assembly. The tubular feedflow control member has an upper annular portion which is internally threaded and is engaged with external threads formed on the lower portion of the feed drop. These threads are formed to create an interference fit therebetween, and for this purpose the feed drop and control member are preferably formed (as by being molded) of a plastic material. The interference fit between the threads permits the control member to be rotated and hence its elevation infinitely adjusted through a selected range so as to vary the vertical spacing (and hence the annular gap) between the pan bottom and the lower end of the control member. While the control member can be readily manually rotated to adjust the feed gap as desired, nevertheless the interference threads between the feed drop and control member securely maintain the control member in its adjusted position, without requiring external detents or the like. The interference thread arrangement is preferably provided with one or more elongated grooves extending axially therethrough, such as grooves formed on the feed drop, for permitting contaminating materials to be wiped off the threads into the grooves, and then fall downwardly therethrough into the feed pan. One of these slots preferably has indicia, such as numbers, associated therewith so that the operator can readily determine and record the desired adjusted position of the control member. The control member preferably has the lower portion thereof formed as a conical skirt which flares outwardly and surrounds the raised conical center portion of the pan so as to provide proper control over the flow of the feed through the annular gap.

Other objects and purposes of the improved poultry feeder will be apparent to persons familiar with structures of this type upon reading the following description and inspecting the accompanying drawings.

Figure 1:
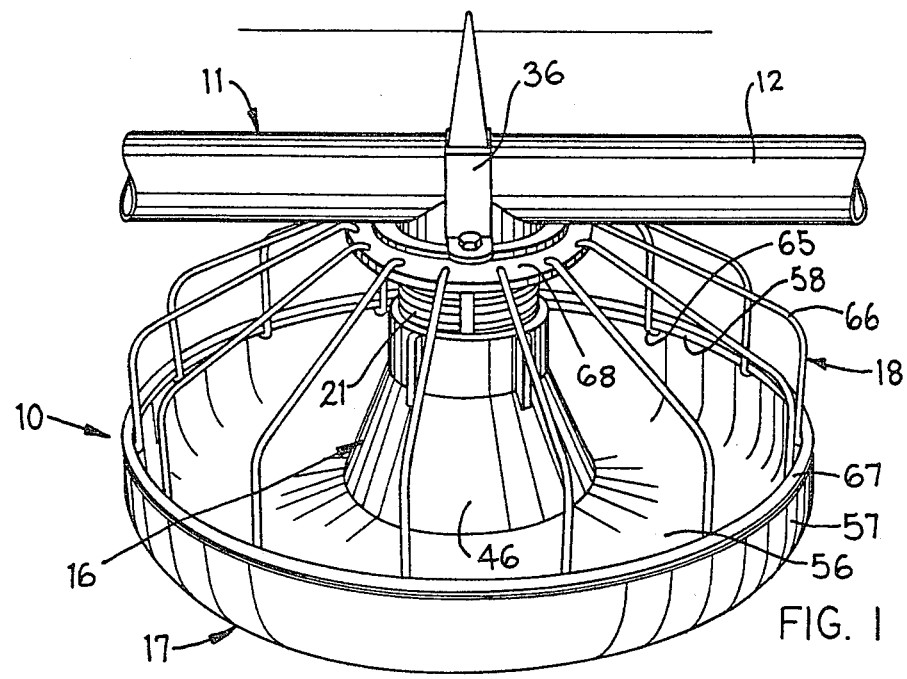
FIG. 1 is a perspective view illustrating the improved poultry feeder of this invention as mounted on a conventional feed conveyor.

Certain terminology will be used in the following description for convenience in reference only, and will not be limiting. For example, the words "upwardly", "downwardly", "leftwardly" and "rightwardly" will refer to directions in the drawings to which reference is made. The word "forwardly" will refer to the normal direction of feed flow through the system, and the word "downwardly" will also be used to refer to the free-falling of the feed from the conveyor through the control assembly into the pan. The words "inwardly" and "outwardly" will refer to directions toward and away from, respectively, the geometric center of the assembly and designated parts thereof. Said terminology will include the words specifically mentioned, derivatives thereof, and words of similar import.

DETAILED DESCRIPTION

Referring to FIG. 1, there is illustrated the improved pan-type poultry feeder 10 associated with a conveyor 11 which, in the illustrated embodiment, comprises an elongated feed supply tube 12 adapted to have a plurality of feeders 10 mounted thereon at selected intervals.

Figure 3:
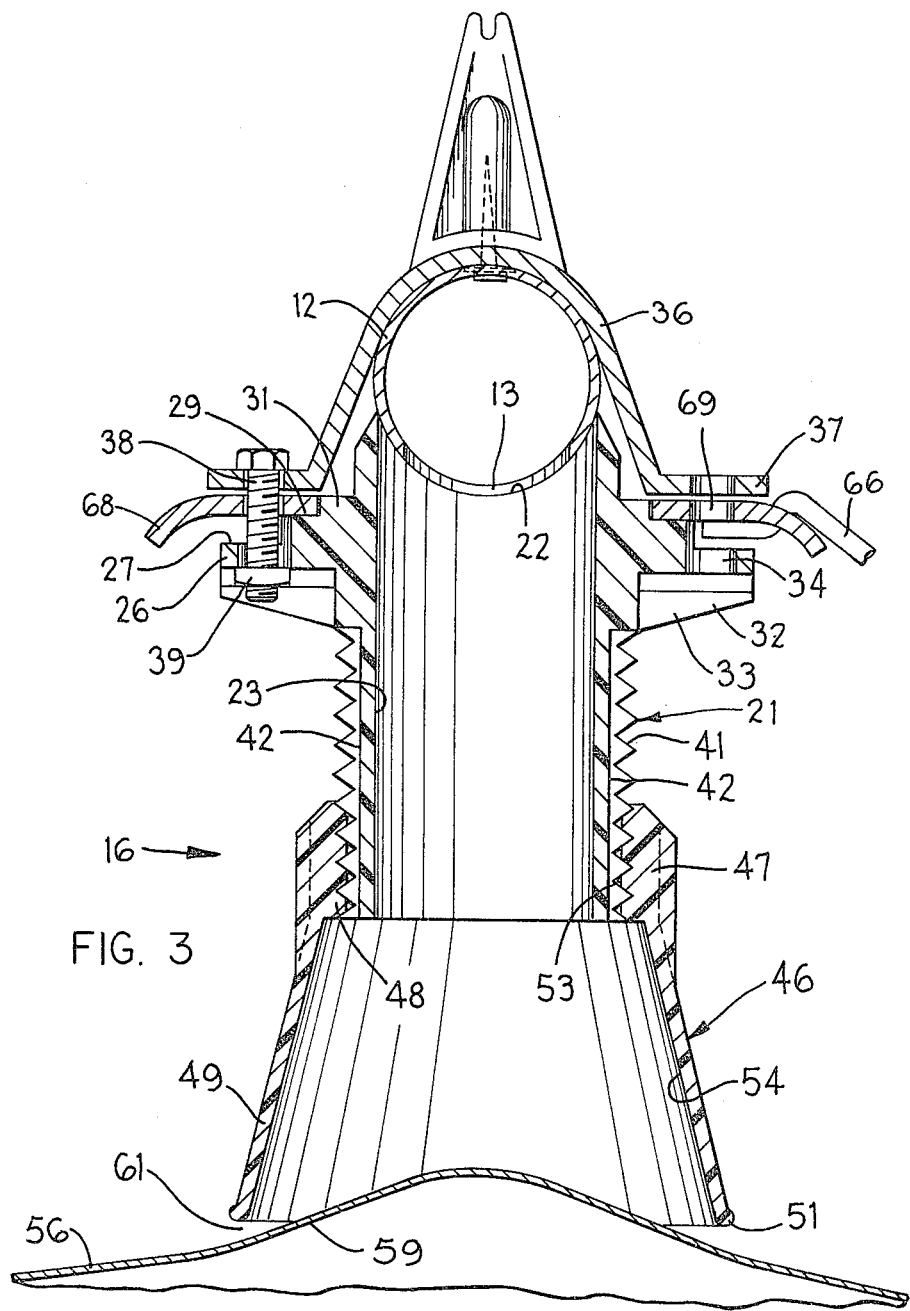
FIG. 3 is a fragmentary sectional view taken substantially along line III—III in FIG. 2.
Figure 4:
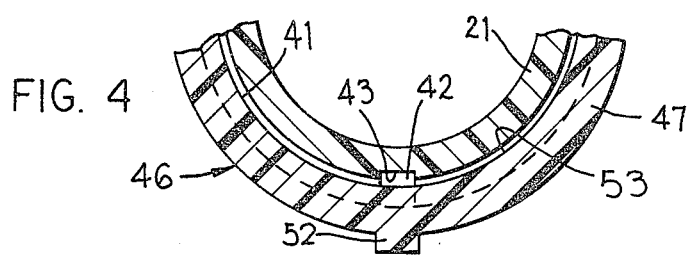
FIG. 4 is an enlarged fragmentary sectional view taken substantially along line IV—IV in FIG. 2.

The feed supply tube 12 has a conventional conveying member (not shown) such as a rotatable auger or chain therein for supplying feed through the tube, with the feed being discharged from tube 12 through an opening 13 (FIG. 3).

The feeder 10 includes a feed control assembly 16 which is supported on and projects downwardly from the conveyor 11. A pan 17 is disposed below the feed control assembly 16 for receiving therein the feed, which pan is attached to and suspended by a grille 18, the latter being supported on the feed control assembly 16.

Figure 2:
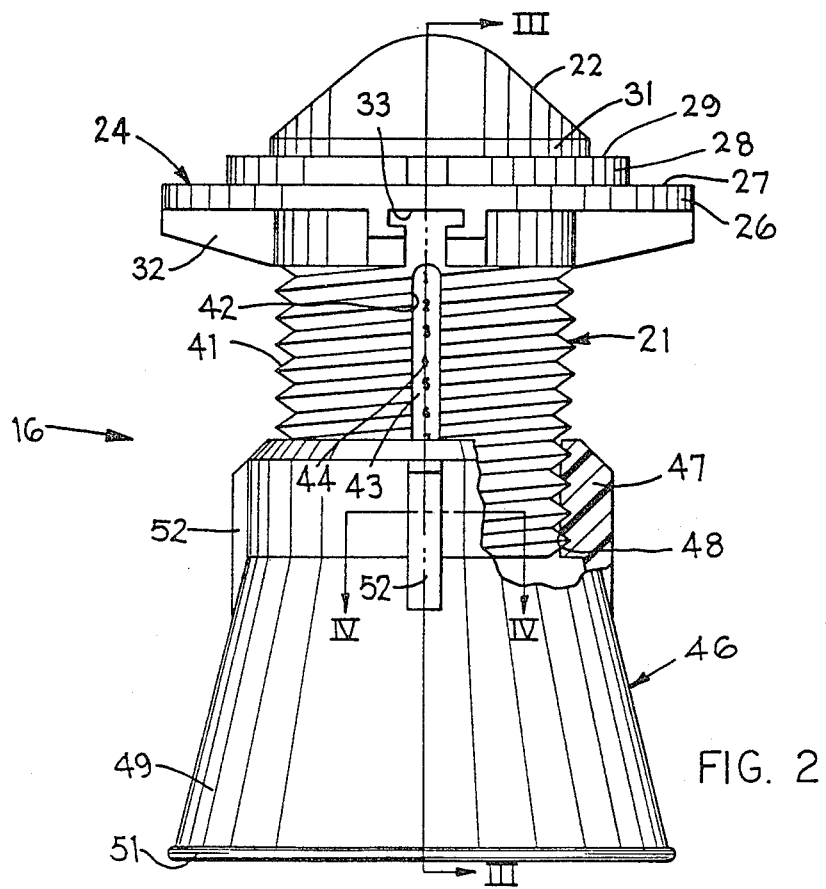
FIG. 2 is an enlarged elevational view, partially broken away, illustrating the improved feed control assembly.

As illustrated by FIGS. 2 and 3, the feed control assembly 16 includes a tubular feed drop member 21 which is fixed to and projects substantially vertically downwardly from the conveyor tube 12. The upper end of the drop member 21 has a substantially semi-cylindrical seat 22 so that the drop member 21 can be positioned in snug engagement with the exterior cylindrical periphery of the conveyor tube, the drop member being disposed so that its cylindrical opening 23 is aligned with the discharge opening 13 provided in the conveyor tube.

The feed drop member 21 has an enlarged annular flange 24 in the vicinity of the upper end thereof. This flange 24 is axially stepped and includes a lower annular portion 26 which defines thereon an upper surface or shoulder 27. An intermediate annular portion 28 is of slightly smaller diameter and defines thereon an upper surface or shoulder 29, with an upper annular portion 31 projecting upwardly from this latter surface. The underside of flange 24 also has a plurality of circumferentially-spaced webs or ribs 32 fixed thereto and projecting radially thereof, which ribs 32 are tapered as they project radially outwardly. Two of these ribs, as provided on diametrically opposite sides of the drop member, have T-shaped slots 33 formed therein, which slots project radially outwardly through the ends of the rib, with the base of the slots also opening downwardly through the bottom of the ribs.

Annular flange 24 also has a pair of openings 34 extending therethrough on diametrically opposite sides thereof in communication with slots 33.

The drop member 21 is fixed to conveyor tube 12 by a U-shaped top clamp 36 which straddles the tube 12 and is locked in position by a headed fastener which projects into a hole in tube 12 so as to locate and lock the assembly. The clamp 36 terminates in outwardly-projecting flanges 37 which overlie but are spaced upwardly from the lower flange portion 26. A limited threaded bolt 38 extends through an opening in the flange 37 and through the opening 34 in the lower annular portion, which bolt 38 is threadably engaged with a nut 39, the latter being slidably captivated within the head portion of the T-shaped slot 33. Tightening of bolts 38 hence causes the drop member 21 to be fixed to and securely seated against the underside of the conveyor tube 12 substantially as illustrated by FIG. 3.

The lower portion of feed drop 21, namely that portion below the flange 24, is provided with an external thread 41 thereon. This lower portion is also provided with at least one, and preferably several, slots 42 extending axially throughout the length of the external threads 41, which slots open downwardly through the lower free end of the feed drop 21 so that feed which collects on the threads can be pushed into the slots and fall into the pan. In the illustrated embodiment, the feed drop is provided with two slots 42 disposed on diametrically opposite sides thereof. These slots extend directly through the threads 41, and the bottom wall 43 of the slot 42 is disposed so as to be substantially flush with or slightly recessed inwardly from the root diameter (that is, the minimum diameter) of the threads 41. The bottom wall 43 associated with at least one slot 42 is also provided with indicia 44 spaced vertically therealong, which indicia in the illustrated embodiment comprises a set of progressively increasing reference numerals, although other types of indicia such as alphabetic indicia can be utilized.

The feed control assembly 16 also includes an adjustable feed-flow control member 46 which is adjustably supported on the drop member 21. This control member 46 is of an elongated tubular configuration and includes a support ring 47 at the upper end thereof. This support ring is provided with an internal thread 48 sized for threaded engagement with the external threads 41 so that the control member is thus threadably telescoped over the drop member 21.

The adjustable control member 46 also includes a conical skirt portion 49 which flares outwardly and hence is of progressively increasing diameter as it projects downwardly from the support ring 47. This skirt portion flares outwardly relative to the vertical at an angle approximately within the range of between 10° and 20°, and preferably approximately 14°. The interior diameter of the conical sleeve portion, at its upper end, is slightly greater than the maximum diameter of the threaded portion of the feed drop 21 so that the latter can freely project downwardly into the skirt portion.

The skirt portion 49, at its lower free edge, terminates in an annular bead or flange 51 which is provided with a smooth or rounded cross-section to facilitate the smooth flow of feed therepast.

The adjustable control member 46 is also preferably provided with several gripping ribs 52 thereon, which ribs 52 in the preferred embodiment are spaced circumferentially around the support ring 47 and project radially therefrom.

The internal threads 48 are preferably of a truncated configuration. That is, the tips of the threads 48 are removed so that the threads terminate in a flat upper surface 53, thereby increasing the radial width of the clearance spaces defined by the axial slots 42, which spaces project axially downwardly through the mated threads and hence open into the interior of the conical skirt.

Considering now the pan 17, same includes a bottom wall 56 having an upwardly-projecting annular sidewall 57 therearound, which sidewall has a rim 58 at the upper edge thereof. The bottom wall 56 has a generally raised conical configuration, such as illustrated at 59 in FIG. 3, with the center of the bottom wall being the highest point so that the feed migrates downwardly and outwardly toward the outer edge of the pan.

The pan is supported by the grille 18, which includes a plurality of wires or spokes 66 which are uniformly spaced circumferentially around the pan and, adjacent their lower ends, are joined to a split mounting ring 67. This mounting ring can be resiliently compressed so that hooks 65 on the lower ends of spokes 66 can be inserted into the pan beneath the rim 58, following which the mounting ring resiliently expands back to its original shape so as to be positioned directly above the pan rim 58. The upper ends of spokes 66 are suitably connected to a top plate 68 which is positioned directly below the auger tube in surrounding relationship to the tubular feed drop 21, so that the top plate 68 is seated on the upper surface 29. The region directly above the upper surface 27 provides clearance for the inner ends of the spokes. The top plate 68 also has oversized openings 69 therethrough so as to permit the clamping bolts 38 to extend therethrough.

The top plate 68 is somewhat loosely confined between the flanges 37 and the upper surface 29, whereby the grille 18 and pan 17 will have a limited amount of freedom so that the pan can be slightly jiggled or moved by the poultry to further assist in dispensing feed.

The pan 17 and grille 18 are conventional, and it will be appreciated that numerous other pan and grille configurations and mounting arrangements can be provided.

The cooperating threads 41 and 48 are formed to create an interference fit therebetween. This interference fit can be created in different ways, such as by making the threads on one of the members slightly larger than the mating thread groove provided on the other member, or by making the tapers on the mating threads somewhat different so as to create a physical interference. In this manner, while the threads permit the flow control member 46 to be rotated so as to adjust its position, nevertheless the interference fit creates a sufficient holding of the control member 46 so as to prevent accidental rotation thereof such as might be caused by vibration or jiggling of the system. Hence, the control member 46 can be easily adjusted solely by manual rotation thereof, which can be easily accomplished by use of a single hand, and at the same time the control member will remain in its adjusted position without requiring the use of separate detents or locking devices.

This interference fit between the threads of the members 21 and 46 is desirably achieved by forming each of these members as a single unitary element, as by forming them from plastic, preferably utilizing a molding technique. For this purpose, the members 21 and 46 are preferably molded from a rather rigid plastic material, such as a medium or high density polyethylene, which material permits the threads to be provided with the desired interference fit so as to permit a secure and stationary holding of the control member 46, while at the same time enabling the control member 46 to be manually rotated when desired without requiring exertion of excessive torque. Further, by molding the members 21 and 46 from plastic, each member can be easily and economically fabricated, and at the same time the interior openings in these two members can be provided with clean and smooth surfaces which greatly facilitate the flow of feed therethrough.

With this arrangement, the complete feed control assembly 16 is formed solely by two members, namely the drop member 21 and the adjustable control member 46, and no additional members such as support clips or springs are necessary. Hence, the feed control assembly can be manufactured and assembled in an economical manner and at the same time provides an extremely durable assembly having greatly increased ease of operation.

OPERATION

While operation of the poultry feeder according to this invention is believed evident from the above description, nevertheless same will be briefly described to insure a complete understanding of same.

With the feeder assembly assembled as illustrated in FIG. 1, feed is supplied from a hopper (not shown) into the conveyor 11, with the feed being displaced along the conveyor tube 12 by any conventional feed advancing system, such as a rotatable auger or a linearly movable chain. In this manner, the feed is moved along the tube 12, and some of the feed is discharged through the opening 13 into the pan-type poultry feeder 10.

If feed is not to be supplied to the pan of a selected poultry feeder 10, then the adjustable control member 46 is rotated so as to be moved downwardly into its lowermost position, in which position the lower edge or flange 51 associated with the conical skirt 49 effectively bears against the bottom wall 56 of the pan. Hence, while feed will collect and build up within the feed control assembly 16, nevertheless the feed can not effectively migrate outwardly into the exposed portion of the pan.

To permit the feed to migrate radially outwardly into the exposed annular portion of the pan 17, the adjustable control member 46 is manually threadably rotated about the drop member 21, which causes the control member to be axially raised upwardly away from the bottom wall of the pan, thereby creating an annular discharge gap 61 therebetween. The width of this gap is determined by the rotational position of the control member 46 relative to the drop member 21, whereupon the vertical height of this gap 61 can thus be selected to provide optimum flow of feed from within the control assembly 16 radially outwardly along the conical bottom wall 56 of the pan so as to be accessible to the poultry. Due to the capability of manually rotating the control member 46 through any desired number of complete revolutions or through even fractional revolutions, the height (that is the width) of the gap 61 is hence infinitely adjustable from its closed position to its maximum open position, which latter position is defined when the control member is rotated such that the support ring 47 is positioned at the upper end of the external threads 41. Hence, the discharge gap 61 is infinitely and continuously adjustable, without steps or increments, over a range which is normally several inches in length.

Since it becomes necessary to adjust the feed flow as the poultry grows, and inasmuch as poultry raisers determine the amount of feed which should be supplied to the poultry, the indicia 44 enables a person to readily visually observe the adjusted position of the control member (which adjusted position and visual indication indicates the width of the gap 61) so as to record the width of the discharge gap, and permit repetitive setting of the feed control assembly in the desired position.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a poultry feeding apparatus for mounting on a conveyor tube of a poultry feeding system, said feeding apparatus including a tubular feed-drop member adapted to be secured to and depend downwardly from the conveyor tube for discharging feed downwardly therethrough, a feed pan positioned below and spaced downwardly from the lower end of the feed-drop member for receiving feed therein, and a hollow feed-flow control member adjustably mounted on the feed-drop member in telescopic relationship therewith and projecting downwardly therefrom so that the lower end of the hollow control member is adjustably positionable above the bottom wall of the pan for controlling the flow of feed into the pan, the improvement wherein the feed-drop and control members have cooperating opposed threads disposed in meshing engagement for selectively adjusting the elevation of the control member in response to rotation thereof so as to vary the feed-discharge gap between the lower end of the control member and the bottom wall of the pan, the cooperating threads on the feed-drop and control members creating an interference fit therebetween for securely stationarily holding the control member in its selected adjusted position while permitting selected manual rotation of the control member for adjusting its elevation and hence adjusting said feed-discharge gap, the control member being stationarily maintained in its selected adjusted position solely due to the interference fit created between the threads so that no additional locking or detent structures or devices are required.

2. An apparatus according to claim 1, wherein the feed-drop and control members are each formed as a unitary one-piece member constructed of a plastic material.

3. An apparatus according to claim 2, wherein one of said feed-drop and control members has an elongated clearance groove formed therein and extending axially through the threaded portion thereof, said groove opening downwardly through the lower end of the threaded portion for free communication with the interior of the control member so that contaminants or feed which collects on the exposed threads will be pushed into the clearance groove and then fall downwardly therethrough into the pan.

4. An apparatus according to claim 2, wherein the feed-drop member includes a lower tubular portion which has a multiple-revolution spirally-extending external thread therearound, said external thread projecting upwardly from the lower free end of said lower portion through a selected axial extent, said control member including a support ring adjacent the upper end thereof which is internally threaded and which extends through an axial extent substantially less than the axial extent of the external thread, said support ring concentrically surrounding said feed-drop member so that the internal thread of the support ring is threadably engaged with said external thread, said control member including a substantially cylindrical skirt portion which is fixed to and projects axially downwardly from said support ring so that the lower free edge of said skirt portion is positionable in close proximity with the bottom wall of said pan, said skirt portion defining therein an interior opening which extends downwardly from said support ring and is of larger diameter than said external thread so that the externally-threaded lower portion of said feed-drop member can project therein.

5. An apparatus according to claim 4, wherein said skirt portion is of a truncated conical configuration which flares outwardly as it projects downwardly from said support ring.

6. An apparatus according to claim 4, including at least one axially-extending clearance groove formed in the exterior surface of the lower portion of said feed-drop member and projecting axially through said external thread and opening downwardly through the lower free end thereof, whereby said clearance groove enables feed which collects on said external thread to be wiped into the clearance groove when the control member is rotated so that the feed falls axially downwardly through the clearance groove into the pan.

7. An apparatus according to claim 6, including indicia means provided along said groove and cooperating with the upper surface of said support ring for permitting visual determination as to the elevational position of the control member relative to said drop tube member.

8. An apparatus according to claim 1, wherein the control member is formed as a unitary one-piece member constructed of a plastic material, said control member including a support ring adjacent the upper end thereof which is internally threaded and has an interference fit with external threads formed on the feed-drop member, said control member also having a cylindrical skirt portion which is fixed to and projects axially downwardly from the support ring so that the lower free edge of the skirt portion is positionable in close proximity with the bottom wall of the pan, said skirt portion being of a truncated conical configuration which flares outwardly as it projects downwardly from the support ring.

9. In a pan-type poultry feeding apparatus including a shallow upwardly-opening feed pan having a bottom wall, and an adjustable feed control assembly positioned above the center portion of the pan and projecting upwardly therefrom for adjustably controlling the flow of feed into said pan, the improvement wherein said adjustable feed control assembly consists solely of two tubular one-piece members, one of said members comprising a hollow feed-drop sleeve which is approximately vertically oriented, and the other of said members comprising a hollow one-piece flow-control sleeve which is also approximately vertically oriented, said flow-control sleeve having an upper portion thereof disposed in telescopic surrounding relationship to said feed-drop sleeve and being connected thereto, said flow-control sleeve projecting downwardly below said feed-drop sleeve so that the lower free end of the flow-control sleeve is positionable in close proximity to the bottom wall of said pan, each of said feed-drop and flow-control sleeves being constructed integrally in one piece of a plastic material, said feed-drop sleeve having a lower cylindrical portion which is externally threaded, said flow-control sleeve having an upper support ring which is internally threaded and is disposed in threaded engagement with the external thread on said feed-drop sleeve, the mating internal and external threads creating an interference fit therebetween for normally securely holding the flow-control sleeve in a selected elevation while enabling the flow-control sleeve to be selectively manually rotated relative to the feed-control sleeve to adjust the elevation thereof for varying the feed-discharge gap between the bottom wall of the pan and the lower free end of the flow-control sleeve, the interference fit between said internal and external threads being the sole structure for normally stationarily maintaining said flow-control sleeve in its selected adjusted position so that no additional locking devices are required, and said flow-control sleeve also including a conical skirt portion which is integrally fixed to and projects axially downwardly from said support ring and flares radially outwardly as it projects axially downwardly.

10. An apparatus according to claim 9, wherein said feed-drop sleeve has flange means integrally fixed thereto and projecting outwardly therefrom at an elevation above the external thread, and a grille-like support structure extending between said flange means and a sidewall of said pan for suspending said pan below the flow-control sleeve, said support structure including a plurality of circumferentially-spaced rodlike elements which extend vertically between said pan and said flange means.

11. An apparatus according to claim 9, including indicia means coacting between said sleeves for visually determining the elevation of said flow-control sleeve relative to said feed-drop sleeve.

12. An apparatus according to claim 9 or claim 11, including groove means formed in the exterior periphery of said feed-drop tube and extending upwardly from the lower free end thereof throughout the full axial extent of the external thread for permitting feed which collects on the threads to be pushed therefrom into the groove means so that it may fall downwardly therethrough into the pan.

13. In a poultry feed-dispensing apparatus for mounting on a conveyor tube of a poultry feeding system, said feed-dispensing apparatus including a tubular feed-drop member adapted to be secured to and depend downwardly from the conveyor tube for discharging feed downwardly therethrough, a feed pan positioned below and spaced downwardly from the lower end of the feed-drop member for receiving feed therein, and a hollow feed-flow control member adjustably mounted on the feed-drop member in telescopic relationship therewith and projecting downwardly therefrom so that the lower end of the hollow control member is adjustably positionable above the bottom wall of the pan for controlling the flow of feed into the pan, the improvement wherein the feed-drop and control members having cooperating opposed threads disposed in meshing engagement for selectively adjusting the elevation of the control member in response to rotation thereof so as to vary the feed-discharge gap between the lower end of the control member and the bottom wall of the pan, the cooperating threads on the feed-drop and control members creating an interference fit therebetween for securely stationarily holding the control member in its selected adjusted position while permitting selected manual rotation of the control member for adjusting its elevation relative to the pan and hence adjusting said feed-discharge gap, and one of said feed-drop and control members having an elongated clearance groove formed therein and extending axially through the threaded portion thereof, said groove opening downwardly through the lower end of the threaded portion for free communication with the interior of the control member so that contaminants or feed which collect on the threads will be pushed into the clearance groove and then fall downwardly therethrough into the pan.

14. An apparatus according to claim 13, wherein at least one of said feed-drop and control members is formed as a unitary one-piece member constructed of a plastics material, said control member having a skirt portion which is of a truncated conical configuration and flares outwardly as it projects downwardly toward the pan, said clearance groove being formed in and extending axially through the external threads formed on the feed-drop member, and a series of numerical indicia being disposed vertically along said clearance groove for visually determining the elevation of the flow-control member relative to the feed-drop member to thereby indicate the selected adjusted size of the feed-discharge gap.

* * * * *